(12) United States Patent
Brunt (10) Patent No.: US 10,638,894 B2
(45) Date of Patent: May 5, 2020

(54) WATERLESS TOILET (71) Applicant: Richard James Brunt, Victoria (CA)

(72) Inventor: Richard James Brunt, Victoria (CA)

( * ) Notice: Subject to any disclaimer, the term of this patent is extended or adjusted under 35 U.S.C. 154(b) by 0 days.

(21) Appl. No.: 16/501,776

(22) Filed: Jun. 6, 2019

(65) Prior Publication Data

US 2020/0008632 A1 Jan. 9, 2020

(51) Int. Cl.
*A47K 11/02* (2006.01)
*A47K 11/12* (2006.01)

(52) U.S. Cl.
CPC .............. *A47K 11/02* (2013.01); *A47K 11/12* (2013.01)

(58) Field of Classification Search
CPC ........ A47K 11/02; A47K 11/023; A47K 11/12
USPC ............... 4/434, 438, 439, 440, 441, 442
See application file for complete search history.

(56) References Cited

U.S. PATENT DOCUMENTS

| | | | | |
|---|---|---|---|---|
| 4,196,477 A * | 4/1980 | Stewart | ................. | A47K 11/02 4/111.1 |
| 4,240,164 A * | 12/1980 | Lind | ..................... | A47K 11/02 4/449 |
| 5,276,924 A * | 1/1994 | Hachima | ................ | A47K 11/02 4/111.1 |
| 8,065,756 B2 * | 11/2011 | Yeung | .................... | E03D 5/012 4/434 |
| 9,247,852 B2 * | 2/2016 | Trott | ..................... | A47K 11/02 |
| 2013/0298324 A1 * | 11/2013 | Dreher | ................... | A47K 11/02 4/479 |
| 2015/0067956 A1 | 3/2015 | Morin | | |

* cited by examiner

*Primary Examiner* — Janie M Loeppke
(74) *Attorney, Agent, or Firm* — Baumgartner Patent Law; Marc Baumgartner (57) ABSTRACT

A waterless toilet that separates liquid waste from solid waste is provided. The toilet has a front section which is a urinal and a back section which is a chute with a bore. A trap door is moveable between an open position and a closed position and is controlled by a lever. In the closed position, it forms a leak-proof seal with the rim of the bore. The lever also actuates an inching mechanism that urges a solid waste receptacle to be rotated slightly on each use.

7 Claims, 9 Drawing Sheets

FIG. 7

WATERLESS TOILET

CROSS REFERENCE TO RELATED APPLICATIONS

This application claims benefit of Canadian Patent Application Serial No. 3010958, filed on Jul. 6, 2018, entitled Waterless Toilet, the contents of which are incorporated herein by reference.

FIELD

The present technology is a waterless toilet that diverts urine from solid waste. More specifically, it is a manually operated toilet that has a base separated from an upper section with a urine diverting leak-proof trap door that can manually be moved from a closed position to an open position, and which concomitantly urges a solid waste receptacle to rotate an increment about a central axis.

BACKGROUND

There are many designs of waterless toilets, some of which include features that are designed to separate at least a portion of liquid waste from solid waste. Most, if not all, require that a male sit while urinating and fail to completely stop urine from leaking into the solid waste container. The combination of urine and feces results in very strong sewage odour. Most, also, are not airtight and therefore insects can infest the toilet and expensive heated or cooled air can be exhausted through the toilet as the toilets draw air from within the room.

For example, U.S. Pat. No. 9,247,852 discloses a toilet that comprises a main receptacle for receiving feces and urine, a urine and a fecal receptacle at least a portion of each disposed below said main receptacle for respectively receiving and storing urine and fecal matter. Said main receptacle defining one or more urine apertures in a lower region thereof through which urine may flow out of said main receptacle downwardly into the urine receptacle, said main receptacle shaped to divert urine into the one or more urine apertures. Said main receptacle defining one or more fecal apertures in the lower region thereof through which feces and urine may leave the main receptacle and pass downwardly. Said one or more fecal apertures having a raised perimeter for preventing urine from entering said one or more fecal apertures and said feces receptacle for receiving and storing feces that falls downward through the feces aperture.

The toilet is not airtight, hence air from the room can be sucked into the toilet and vented outside, resulting in a waste of energy in heating or cooling the air. Further, insects can enter into the toilet. In order for the toilet to separate liquid waste from solid waste, males must sit on the toilet. Further, leakage of liquid waste into the solid waste container can occur. The combination of urine and feces results in very strong sewage odour. There is no removable solid waste receptacle, and therefore the solid waste must be removed by suction and in order for this to occur, it must be rehydrated.

United States Patent Application 20150067956 discloses a composting toilet assembly and installation. The composting toilet assembly includes a separating means housed in a pedestal toilet seat. Liquid and solid waste entering the toilet assembly are separated by the separating means which includes a sloping conveyor belt, actuated by control means, which serves to separate the liquid waste from the solid waste by means of gravity. The liquid waste is diverted to a bottom end of the sloping conveyor belt and the solid waste is diverted to an opposing top end of the sloping conveyor belt. A receptacle is attachable at the bottom end of the sloping conveyor belt for collecting the diverted liquid waste for disposal. The solid waste is diverted to the top end of the sloping conveyor belt and through a rear opening of the housing where the solid waste is disposed away from the toilet assembly. The solid waste can be disposed into a composting space located adjacent to the toilet assembly and/or below the toilet assembly. This design does not ensure that there is no leakage of liquid waste into the solid waste container. The toilet is not airtight, hence air from the room can be sucked into the toilet and vented outside, resulting in a waste of energy in heating or cooling the air. Further, insects can enter into the toilet. Further, there is no mechanism to spread the solid waste. In order to at least partially divert urine, a male would have to sit. The combination of urine and feces results in very strong sewage odour.

European Patent Application 1538962A1 discloses a dry toilet which separates urine and solid excrement, wherein urine is conveyed away and the solid excrement is collected in a composting container in the interior of the toilet. The toilet comprises a lower part and a middle part, wherein the toilet encloses a removable composting container. The toilet further comprises an upper part which can be removed between a closed and an open position, wherein the removable composting container can be removed out of the toilet from the lower part of the toilet through an opening between the middle part and the upper part of the toilet in the open position, wherein the middle part, the lower part and upper part of the toilet are firmly connected to each other. This design does not ensure that there is no leakage of liquid waste into the solid waste container. The combination of urine and feces results in very strong sewage odour. The toilet is not airtight, hence air from the room can be sucked into the toilet and vented outside, resulting in a waste of energy in heating or cooling the air. Further, insects can enter into the toilet. Further, there is no mechanism to spread the solid waste. In order to at least partially divert urine, a male would have to sit.

What is needed is an easy to operate, waterless toilet that is airtight when not in use. It would be preferable if it had a leak-proof seal that assists in diverting liquid waste away from the solid waste receptacle in the base as the combination of urine and feces results in very strong sewage odour. It would be preferable if the mechanism for opening and closing a trap door separating an upper section from a lower section, where the solid waste is retained in the solid waste receptacle, also urges the solid waste receptacle to rotate incrementally.

SUMMARY

The present technology is an easy to operate, waterless toilet that is airtight when not in use. It has a leak-proof seal that assists in diverting liquid waste away from the solid waste receptacle in the base. It is very important that urine be diverted from the solid waste, because the combination of urine and feces results in very strong sewage odour. The leak proof seal allows men to stand when urinating. There is a mechanism for opening and closing a trap door separating an upper section from a lower section, where the solid waste is retained in the solid waste receptacle. The mechanism is coupled to an inching mechanism that urges the solid waste receptacle to rotate incrementally, thus distributing the solid waste within the receptacle. This increases the capacity of the receptacle significantly and reduces the frequency with which the toilet must be emptied. The airtightness of the toilet allows external ventilation air to be drawn into the toilet, circulated and exhausted—rather than using expensively heated or cooled ventilation air from within the building, as with prior art. The airtightness of the toilet also prevents ingress by insects.

In one embodiment, a waterless toilet for separating liquid waste from solid waste is provided, the waterless toilet comprising a bowl and a toilet seat which is either integral with the bowl section or is attached to the bowl, the bowl including: a front; a rear opposite the front; a sidewall therebetween; an upper section comprising a chute defining a bore proximate the rear, a urinal proximate the front, the urinal including a drain and a urinal sidewall, the urinal sidewall including an inner surface and a wall between the urinal and the chute; a base below the upper section, the base sized to releasably retain a solid waste receptacle; a divider which separates the upper section from the base, the divider including an underside and an opening which is continuous with the bore; a drain pipe, which is aligned with the drain of the urinal; a trap door, which is housed in the base, is sized to occlude the opening and is moveable from an open position to a closed position, the trap door including a bottom, a front, a back opposite the front, a perimeter therearound and a barrier, the barrier extending upward around the perimeter, except at the front, and sized to extend upward around the chute, wherein the trap door and the underside of the divider are releasably connected and are configured to release in response to a force; and a lever which is attached to the trap door and extends through the divider, the lever for a user to urge the trap door between the open position and the closed position.

In the waterless toilet, the urinal sidewall and the trap door may be releasably connected and are configured to release in response to the force.

In the waterless toilet, the underside of the divider and the trap door may be releasably connected by a first magnetic field in the open position and by a second magnetic field in the closed position.

In the waterless toilet, the urinal sidewall and the trap door, may be releasably connected by at least one magnetic field.

In the waterless toilet, the magnetic fields may each be produced by a pair of magnets to provide a leak-proof seal.

The waterless toilet may further comprise a support, the support attached to the sidewall in the base and extending inward, a holder for the solid waste receptacle, the holder in rotational engagement with the support, and an inching mechanism, the inching mechanism in mechanical communication with the holder.

In the waterless toilet, the inching mechanism may be in driven relation with the trap door, such that it urges the holder to rotate as the trap door moves between the closed and the open position.

In the waterless toilet, the holder may include a rachet on a lower surface, the rachet in rotational engagement with the inching mechanism.

In the waterless toilet, the inching mechanism may include a first arm, which includes a mouth that engages the trap door, a second arm pivotally attached to the first arm and a pawl pivotally attached to the second arm, the pawl moveably engaging the rachet.

In the waterless toilet, the trap door may include a tail extending outward from the back, the mouth engaging the tail.

The waterless toilet may further comprise a toilet lid, the toilet lid including a gasket on an underside, the toilet lid forming an airtight seal with the toilet seat when in a closed position.

The waterless toilet may further comprise a secondary urine collector, which is located below the urinal to define a slot and includes a second drain, the second drain aligned with the drain pipe.

In the waterless toilet, the front of the trap door may be within the slot when the trap door is in the closed position.

The waterless toilet may further comprise a middle section, wherein the middle section is disposed between the upper section and the base and includes the drain pipe.

In the waterless toilet, the toilet may be modular and comprises, as independently molded modules, the upper section, the middle section and the base.

The waterless toilet may further comprise the solid waste receptacle, which is removable.

The waterless toilet may further comprise a lid that forms an airtight seal with the seat.

In the waterless toilet, the barrier of the trap door may include a wing which extends outward from the barrier and retains a magnet of the pair of magnets on each of a side.

In another embodiment, a waterless toilet system is provided, the system comprising a waterless toilet, the waterless toilet comprising a bowl and a toilet seat which is either integral with the bowl section or is attached to the bowl, the bowl including: a front; a rear opposite the front; a sidewall therebetween; an upper section comprising a chute defining a bore proximate the rear, a urinal proximate the front, the urinal including a drain and a urinal sidewall, the urinal sidewall including an inner surface and a wall between the urinal and the chute; a base below the upper section, the base sized to releasably retain a solid waste receptacle; a divider which separates the upper section from the base, the divider including an underside and an opening which is continuous with the bore; a drain pipe, which is aligned with the drain of the urinal; a trap door, which is housed in the base, is sized to occlude the opening and is moveable from an open position to a closed position, the trap door including a bottom, a front, a back opposite the front, a perimeter therearound and a barrier, the barrier extending upward around the perimeter, except at the front, and sized to extend upward around the chute, wherein the trap door and the underside of the divider are releasably connected and are configured to release in response to a force; and a lever which is attached to the trap door and extends through the divider, the lever for a user to urge the trap door between the open position and the closed position, a conduit, the conduit in fluid communication with the fan and an ambient environment exterior to a building, and an exhaust vent, the exhaust vent in fluid communication with an interior of the base and the ambient environment exterior to the building.

In the waterless toilet system, the urinal sidewall and the trap door may be releasably connected and are configured to release in response to the force.

In the waterless toilet system, the underside of the divider and the trap door may be releasably connected by a first magnetic field in the open position and by a second magnetic field in the closed position.

In the waterless toilet system, the urinal sidewall and the trap door may be releasably connected by at least one magnetic field.

In the waterless toilet system, the magnetic fields may each be produced by a pair of magnets to provide a leak-proof seal.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1:
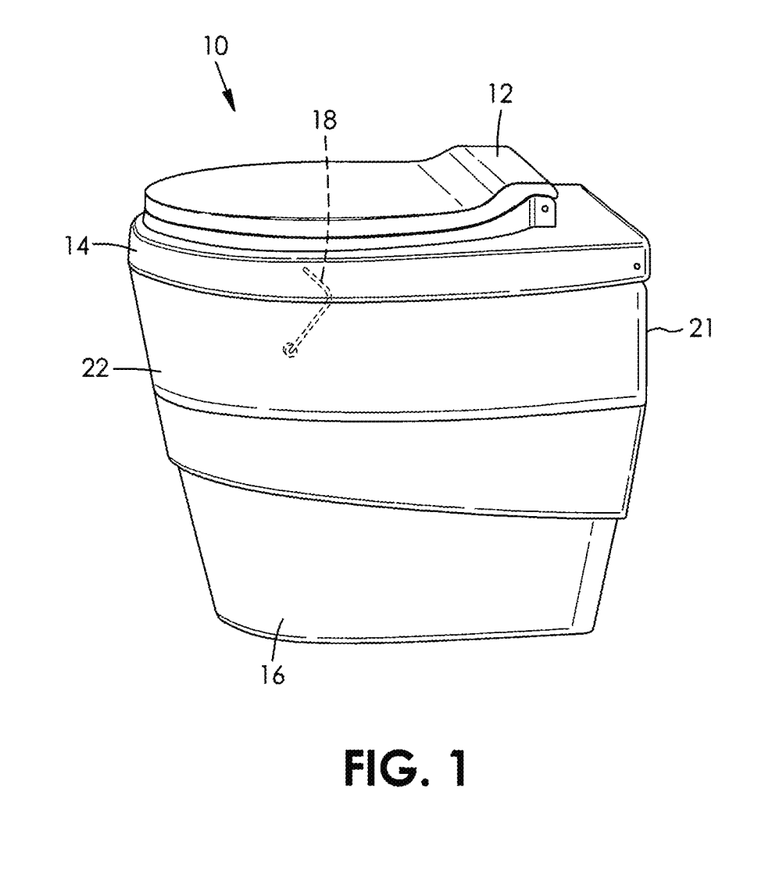
FIG. 1 is a schematic of the waterless toilet of the present technology.

A waterless toilet, generally referred to as 10 is shown in FIG. 1. It has a lid 12, a seat 14, and a bowl 16. A lever 18 is located in an inset in the bowl and is angled towards the rear 21 of the bowl when the toilet is in the closed position and towards the front 22 of the bowl 16 when the toilet 10 is in the open position.

Figure 2A:
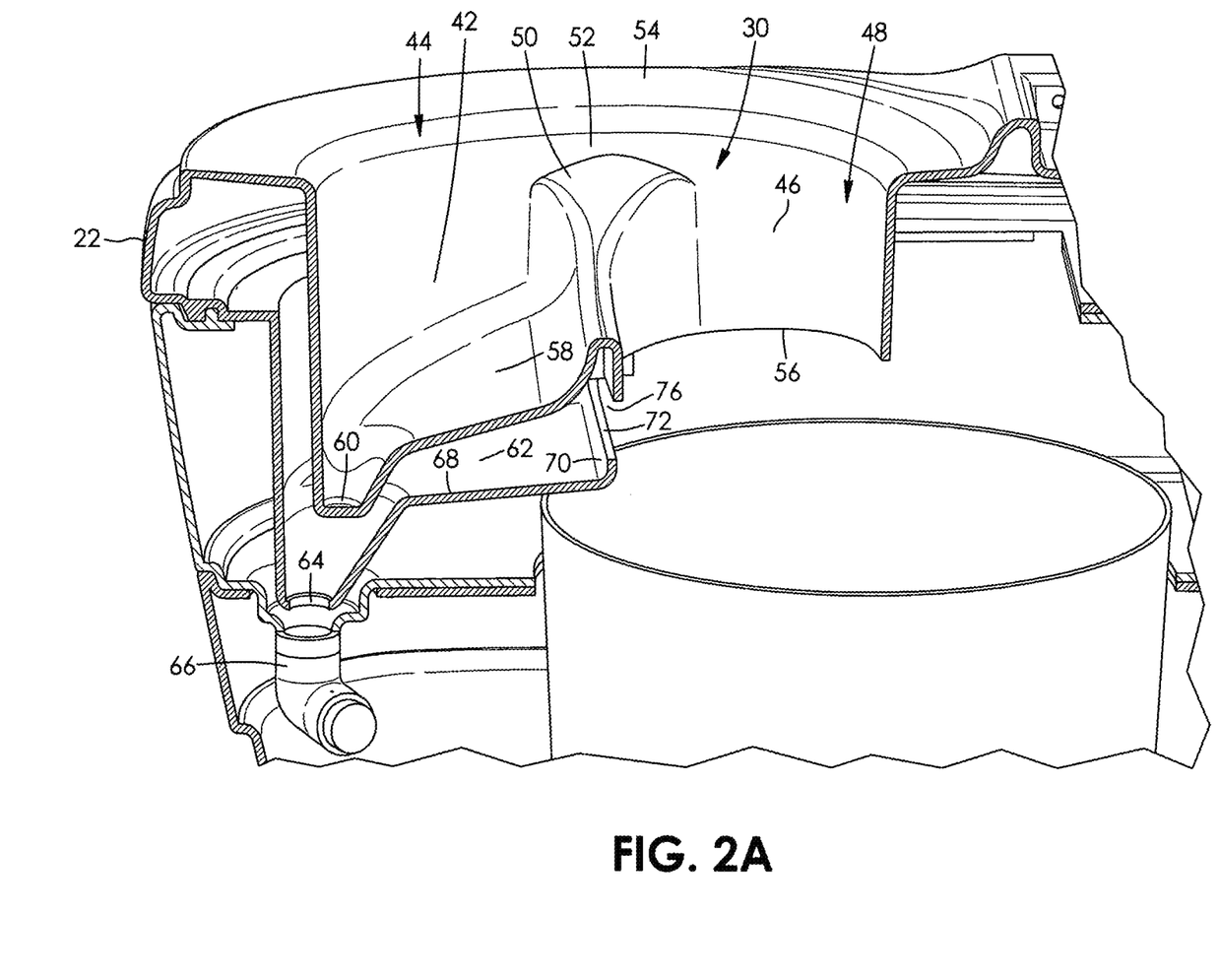
FIG. 2A is a perspective longitudinal sectional view through the bowl of the toilet of FIG. 1.
Figure 2B:
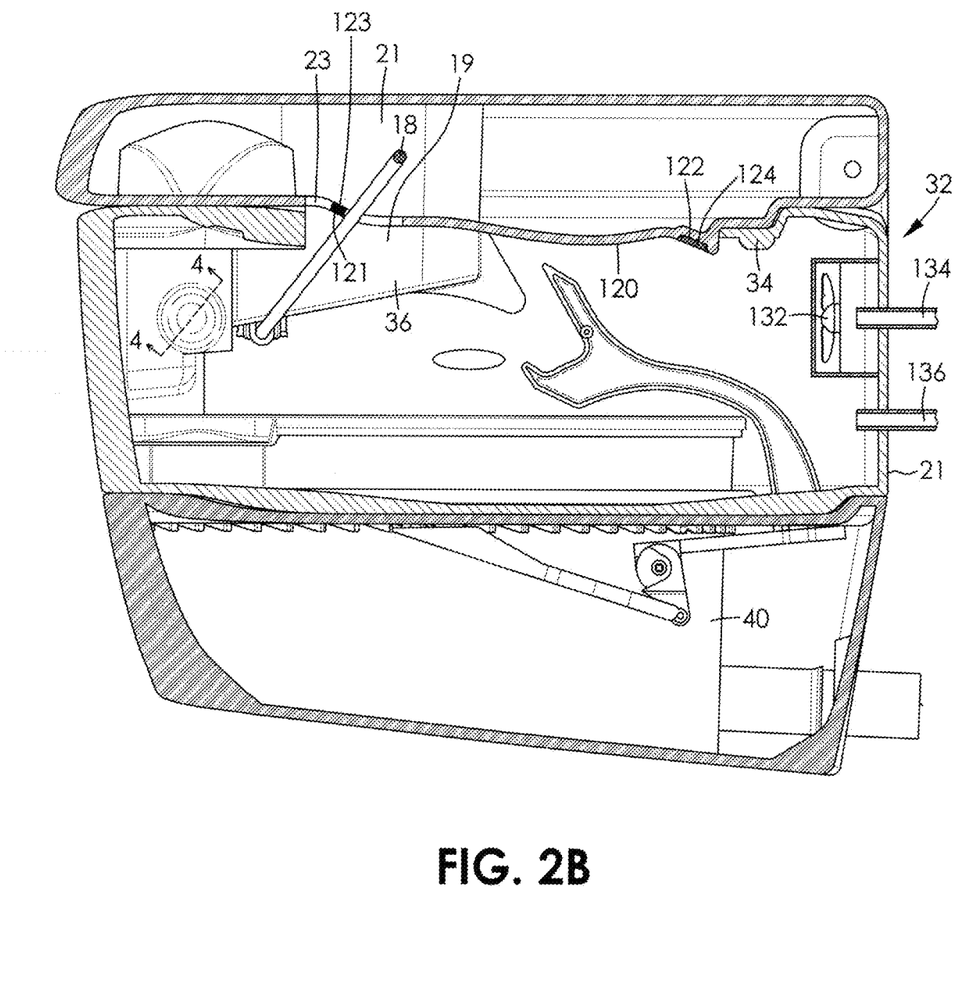
FIG. 2B is a longitudinal sectional view through the bowl of the toilet of FIG. 1.

As shown in FIG. 2A, the bowl 16 is divided into an upper section, generally referred to as 30, and a base, generally referred to as 32. As shown in FIG. 2B, separating the upper section 30 from the base 32 is a divider 34 and a trap door 36. The divider 34 and the trap door 36 together form a leak-proof seal between the upper section 30 and the base 32, when the trap door 36 is in the closed position. A solid waste receptacle 40 is housed within the base 32.

As shown in FIG. 2A, the upper section 30 is divided into a urinal 42 in the front zone, generally referred to as 44, and a rear bore 46 in the chute, generally referred to as 48. The urinal 42 is separated from the rear bore 46 by a wall 50 that extends between the inner sidewall 52 and upward to proximate the top 54 of the bowl 16. It is about 1.5 inches tall at its shortest point. This restricts liquid from leaking or spilling into the rear bore 46. The rear bore 46 is defined by the wall 50, and the inner sidewall 52 of the chute 48. It is continuous with an opening 56 in the divider 34, where the trap door 36 is releasably retained.

The floor 58 of urinal 42 is sloped towards the front 22 of the bowl 16 and terminates in a first drain 60. A secondary urine collector 62 is located below the urinal 42. The first drain 60 drains into the secondary urine collector 62 and is aligned with a second drain 64. The second drain 64 is aligned with a drain pipe 66. The floor 68 of the secondary urine collector 62 is also sloped from the rear end 70 to the front 22 of the bowl 16. The rear end 70 has a lip 72. This prevents liquid from flowing back towards the trap door 36. There is a slot 76 between the floor 58 of the urinal 42 and the floor 68 of the secondary urine collector 62.

Figure 3:
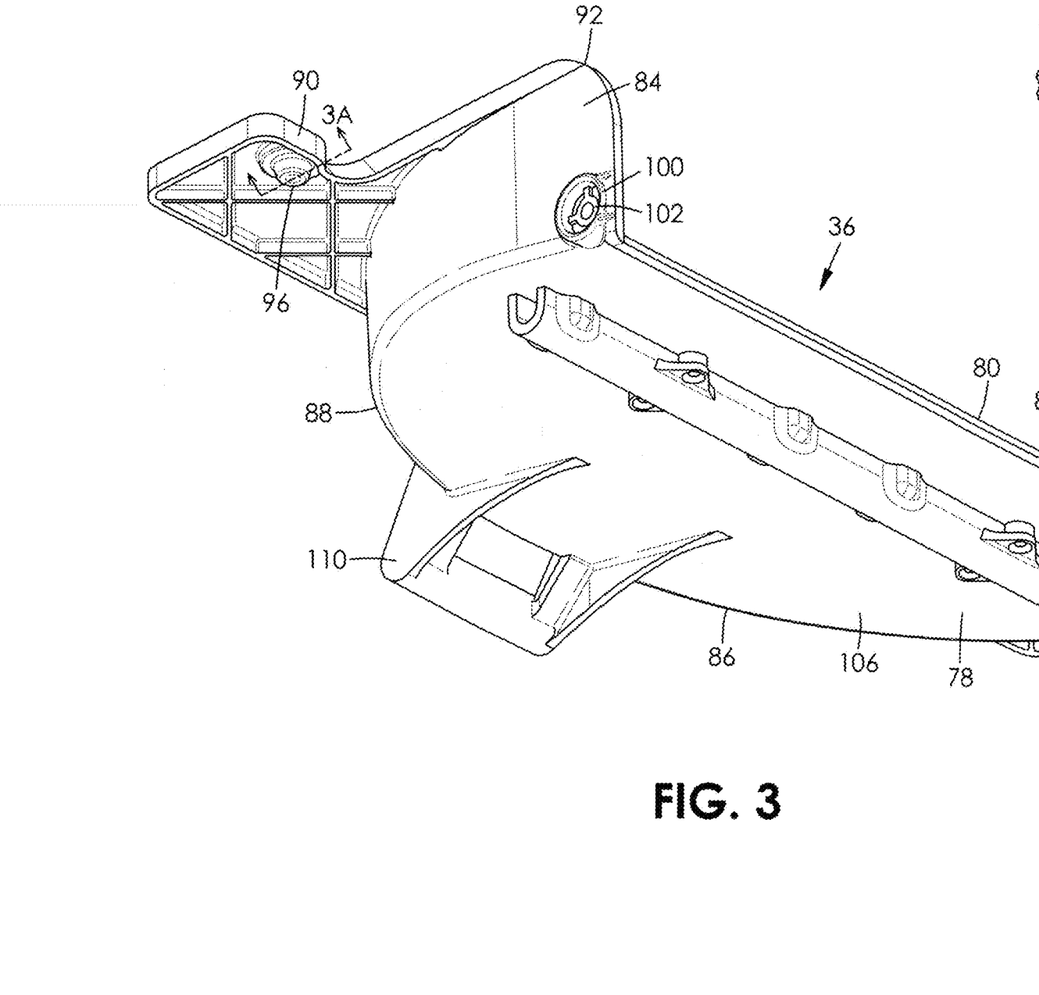
FIG. 3 is a perspective view of the trap door of the toilet of FIG. 1.
Figure 3A:
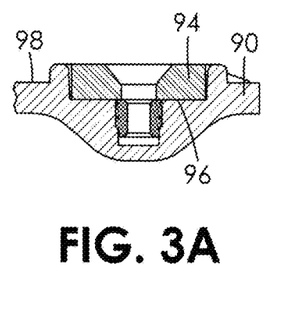
FIG. 3A is a cross sectional view through line 3A of FIG. 3.

Details of the trap door 36 are shown in FIG. 3. The trap door 36 is shaped and sized to occlude the bore 46. As shown in FIG. 3 the trap door 36 has a bottom 78 with a front 80 that has a sill 82. A curved barrier 84 extends upward from the bottom 78 around the perimeter 86 of the bottom 78 and terminating at the front 80. The depth of the barrier 84 increases from the back 88 to the front 80. A wing 90 is attached to the top 92 of the barrier 84 and extends rearward from the back 88 and outward from the barrier 84. As shown in inset 3A, it has two magnets 94 in indents 96 in the top surface 98. It can be seen in FIG. 3, that the magnets are located on either side of the wing 90. Proximate the bottom 78 and front 80, the barrier 84 has two magnets 100 in indents 102 in the outer surface 104. The underside 106 of the bottom 78 has a channel 108 for accepting the lever 18. A tail 110 is attached to the bottom 78 and the back 88 and extends downward and rearward from the back 88. A kerf 112 is located in the underside 106 of the bottom 78, proximate the front 80.

Figure 4:
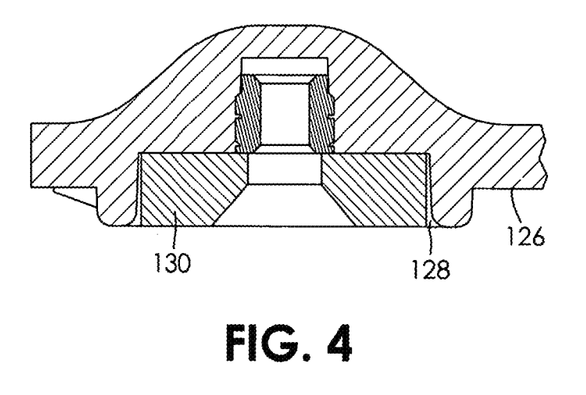
FIG. 4 is a sectional view through the urinal sidewall.

Returning to FIG. 2B, the underside 120 of the divider 34 has two forward indents 121 that house magnets 123 for releasably retaining the trap door in the closed position and two rearward indents 122 that house magnets 124 for releasably retaining the trap door in the open position. These are positioned to slidably, releasably, magnetically attach to the two magnets 94 of the wing 90 with a magnetic field. As shown in FIG. 4, the inner surface 126 of the urinal 42 has two indents 128 that house two magnets 130. These are positioned to slidably, releasably, magnetically attach to the two magnets 100 of the barrier 84 with a magnetic field. The combination of the high barrier and the magnets provides a leak-proof seal between the upper section 30 and the base 32. All the magnets are preferably rare-earth magnets. Returning to FIG. 2B, one or two fans 132 are located in the base 32 at the rear 21 of the toilet 10. The fans 132 draw air from the exterior of the building via a conduit 134. The air is vented back to the exterior of the building via an exhaust vent 136. The lever 18 extends through an opening 19 in the divider 34 into an indent 21 in the seat. A bushing 23 reduces or eliminates air flow through the opening 19.

In an alternative embodiment, a combination of magnets and magnetic materials may be used to form the releasable magnetic pairs and to provide the magnetic fields.

Figure 5A:
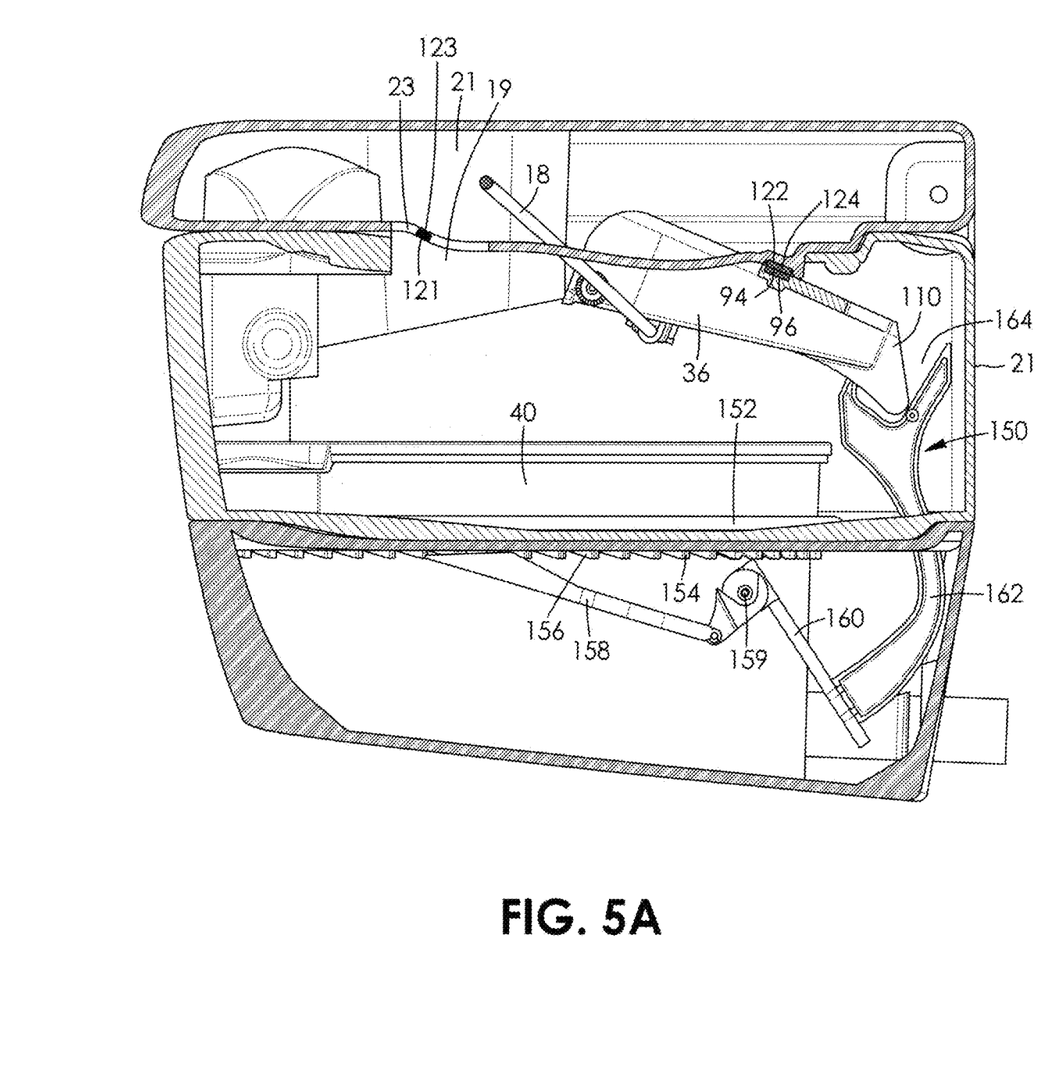
FIG. 5A is schematic of the inching mechanism of the toilet of FIG. 1.

As shown in FIG. 5A, there is an inching mechanism, generally referred to as 150. The inching mechanism 150 rotates the solid waste receptacle 40 incrementally. The solid waste receptacle 40 sits in holder 152 which has a rachet 154 on an underside 156 that extends around the circumference of the holder 152. A pawl 158 is in moveable engagement with the rachet 154 and urges the holder 152 to rotate about its central axis about ¼ inch at a time. The pawl 158 is pivotally linked to a first arm 160, which is pivotally linked to a second arm 162. The pivot joint 159 between the pawl and the first arm is biased. The second arm 162 has a mouth 164 that is shaped and sized to engage the tail 110 of the trap door 36. Hence, when the lever 18 is moved towards the front 22 and the trap door 36 disengages and moves rearwardly, the tail 110 engages the mouth 164 and urges the second arm 162 rearwardly and down, thus urging the first arm 160 down and forward, causing the pawl 158 to urge the holder 152 to rotate.

Figure 5B:
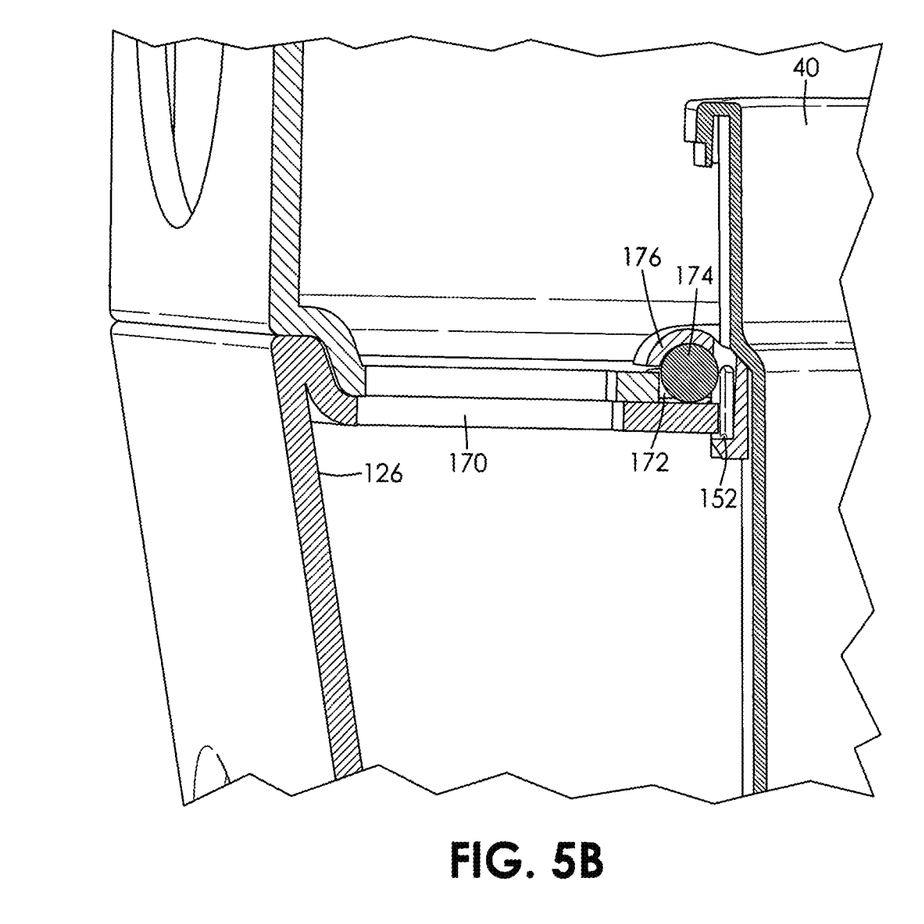
FIG. 5B is a longitudinal sectional view of the support, rachet and holder of the toilet of FIG. 1.

As shown in FIG. 5B, the holder 152 and rachet 154 are rotatably retained by a support 170 that includes a race 172 on its inner circumference. Bearings 174 in the race 172 permit the holder 152 with its rachet 154 to move when urged by the pawl 158. A plastic ring 176 holds the bearing 174 in the race 172. The support 170 is attached to or continuous with the inner surface 126 of the base 32.

Figure 6:
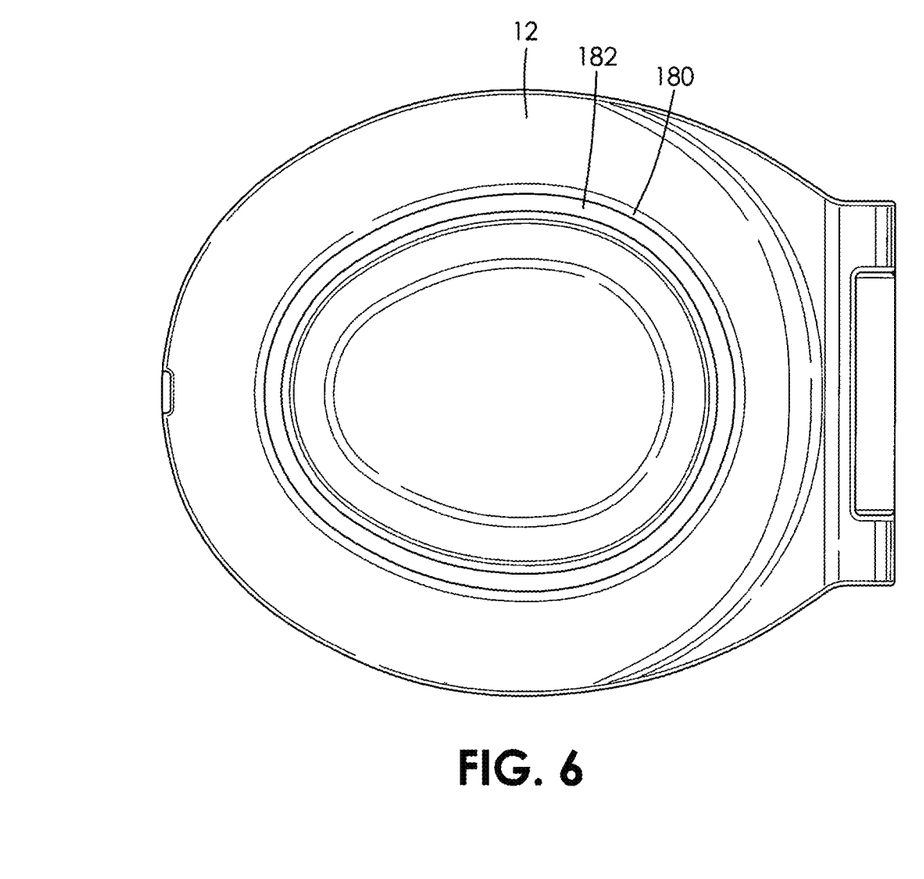
FIG. 6 is a schematic of the underside of the lid of the toilet of FIG. 1.

As shown in FIG. 6, the toilet lid 12 has a recess 180 that retains a gasket 182. The gasket forms an airtight seal with the seat 14.

FIG. 2B shows the trap door in the closed position and FIG. 5A shows the trap door in the fully open position. In the closed position, the sill 82, the kerf 112 and about 0.03 inches to about 0.06 inches, preferably about 0.0534 inches of the trap door 36 are within the slot 76 between the floor 58 of the urinal 42 and the floor 68 of the secondary urine collector 62. The sill 82, the lip 72 and the kerf 112 prevent liquid from flowing backwards to the trap door 36. The barrier 84 fits snugly over the outside of the inner sidewall 52 of the chute 48 (See FIG. 2A). To open the trap door 36, the lever 18 first urges the trap door 36 backwards causing the magnets to slide over one another, thus releasing them, then at an angle backwards until it is in the open position. As would be known to one skilled in the art, rare earth magnets are very strong, and are extremely difficult to separate by pulling them apart but slide easily over one another. Thus, the mechanism was designed to slide the magnets apart by having the trap door 36 in slidable engagement with the inner surface 126 of the urinal 42 and the underside 120 of the divider 34.

Figure 7:
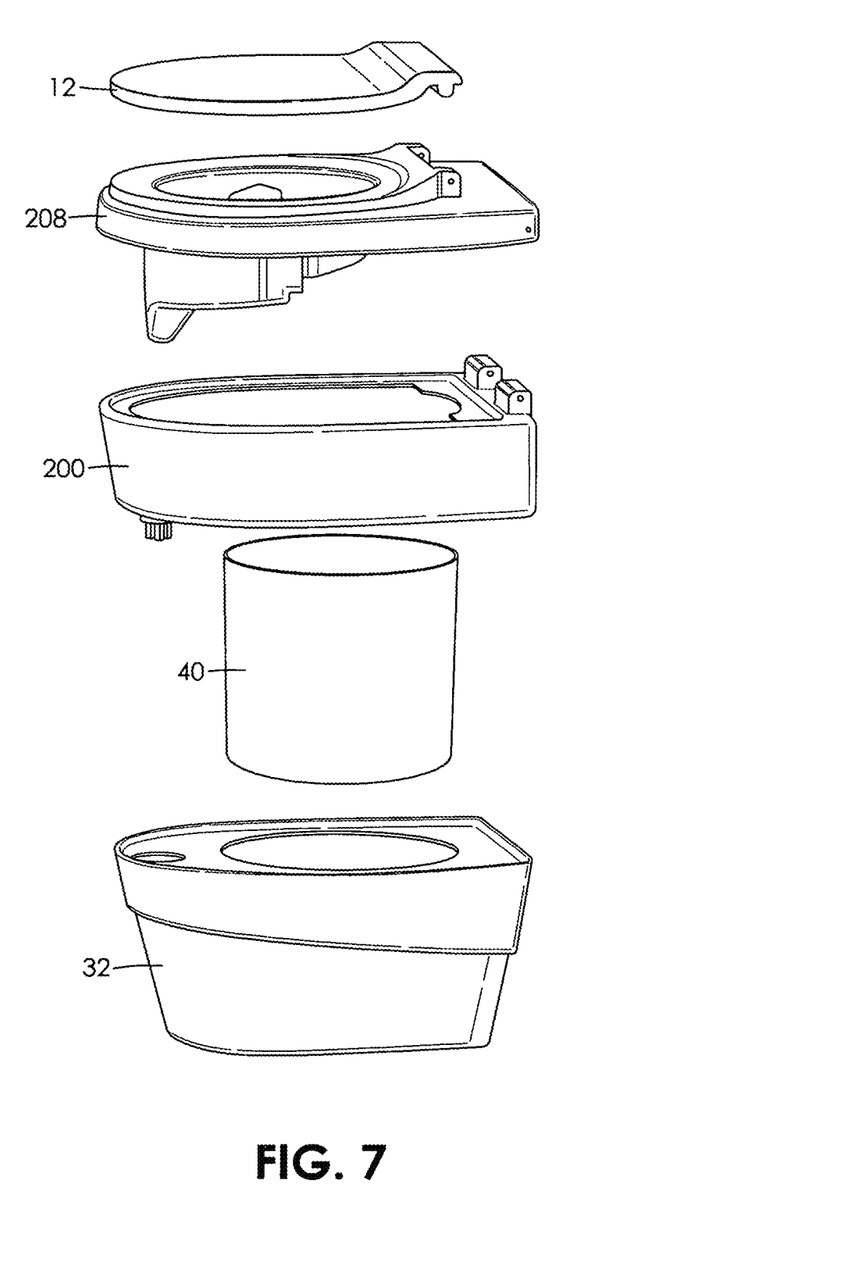
FIG. 7 is an exploded view of the toilet of FIG. 1.

FIG. 7 shows the main components of the toilet 10. The toilet 10 has the base 32, the solid waste receptacle 40, a middle section 200, a seat section 208 (which is also referred to as the upper section 30) and the lid 12. It can be seen that the toilet is modular and is made of modules that are molded separately, and then assembled. Both the upper section 208 and the lid 12 are hinged. The solid waste receptacle 40 can be easily removed by lifting the upper section 208 from the middle section 200.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

What is claimed is:

1. A waterless toilet for separating liquid waste from solid waste, the waterless toilet comprising a bowl, a toilet seat which is either integral with the bowl or is attached to the bowl, and a toilet lid, the toilet lid including a gasket on an underside, the toilet lid forming an airtight seal with the toilet seat when in a closed position, the bowl including: a front; a rear opposite the front; a sidewall therebetween, the sidewall terminating in a top; an upper section comprising a chute defining a bore proximate the rear, a urinal proximate the front, the urinal including a drain and a urinal sidewall, the urinal sidewall including an inner surface and a wall between the urinal and the chute, the wall extending between the sidewall and upward to proximate the top of the bowl; a base below the upper section, the base including a support and a sidewall, the support attached to the sidewall and extending inward, and a holder for releasably retaining a solid waste receptacle, the holder in rotational engagement with the support and including a rachet on a lower surface; an inching mechanism, the inching mechanism in rotational engagement with the rachet and in driven relation with the trap door, such that it urges the holder to rotate as the trap door moves between the closed and the open position, the inching mechanism including a first arm, which includes a mouth that engages the trap door, a second arm pivotally attached to the first arm and a pawl pivotally attached to the second arm, the pawl moveably engaging the rachet; a divider which separates the upper section from the base, the divider including an underside and an opening which is continuous with the bore; a drain pipe, which is aligned with the drain of the urinal; a trap door, which is housed in the base, is sized to occlude the opening and is moveable from an open position to a closed position, the trap door including a bottom, a front, a back opposite the front, a perimeter therearound and a barrier, the barrier extending upward around the perimeter, except at the front, and sized to extend upward around the chute, wherein the trap door and the underside of the divider are releasably connected and are configured to release in response to a force and the urinal sidewall and the trap door are releasably connected by a first pair of magnets in the open position and a second pair of magnets in the closed position to provide a leakproof seal; and a lever which is attached to the trap door and extends through the divider, the lever for a user to urge the trap door between the open position and the closed position.

2. The waterless toilet of claim 1, wherein the trap door includes a tail extending outward from the back, the mouth engaging the tail.

3. The waterless toilet of claim 2, further comprising a secondary urine collector, which is located below the urinal to define a slot and includes a second drain, the second drain aligned with the drain pipe.

4. The waterless toilet of claim 3 wherein the front of the trap door is within the slot when the trap door is in the closed position.

5. The waterless toilet of claim 4, further comprising a middle section, wherein the middle section is disposed between the upper section and the base and includes the drain pipe.

6. The waterless toilet of claim 5, wherein the toilet is modular and comprises, as independently molded modules, the upper section, the middle section and the base.

7. The waterless toilet of claim 6, wherein the barrier of the trap door includes a wing which extends outward from the barrier and retains a magnet of the pair of magnets on each of a side.

\* \* \* \* \*